Sept. 6, 1927.  J. W. ROCKEFELLER, JR  1,641,603
SCALE
Filed April 22, 1926
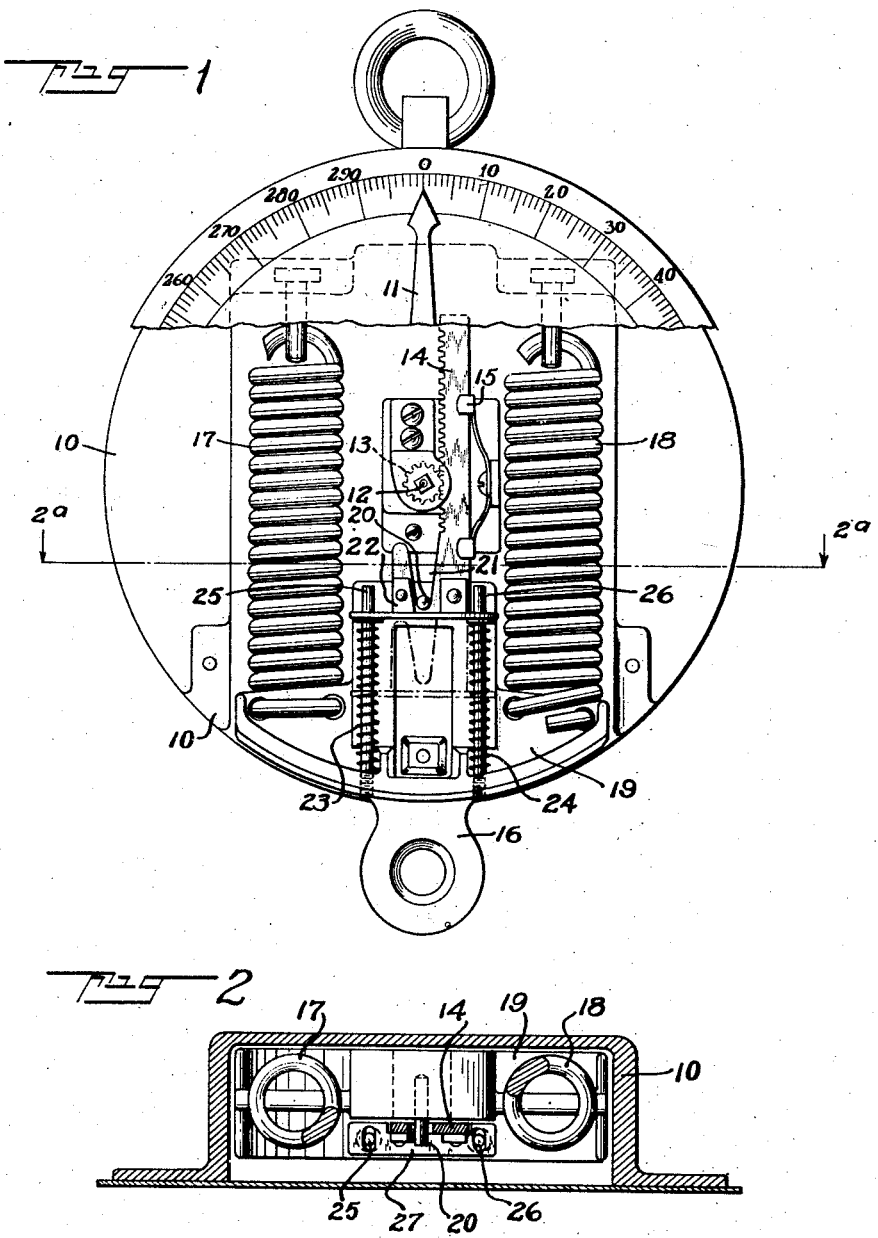
INVENTOR.
John W. Rockefeller, Jr.
BY
ATTORNEYS.

Patented Sept. 6, 1927.

1,641,603

UNITED STATES PATENT OFFICE.

JOHN W. ROCKEFELLER, JR., OF NEW YORK, N. Y., ASSIGNOR TO JOHN CHATILLON & SONS, OF NEW YORK, N. Y., A CORPORATION OF NEW YORK.

SCALE.

Application filed April 22, 1926. Serial No. 103,774.

This invention relates to spring-actuated measuring devices, such as dynamometers, spring balances, and the link, built to carry heavy loads. In such devices, the load is frequently released suddenly—as by rupture of a rope, or in other ways—and, when the indicator and its actuating mechanism are connected with a strong spring, on recoil the force is so strong that frequently the pointer gets bent badly or the teeth of the rack and pinion of the actuating mechanism gets stripped. The object of this invention is to overcome these disadvantages and safeguard the scale against damage on sudden release of the load.

According to this invention, means are provided for actuating an indicator in response to deflection of a strong spring with application of load, and a yieldable, or cushioning, means is arranged to absorb the sudden thrust of the recoil of said spring and prevent its transmission to said indicator or its actuating mechanism. Specifically, a relatively light spring is arranged between the rack of the indicator actuating mechanism and the beam, or other means, connected to the strong spring; so that, on sudden recoil, the beam and the strong spring are snapped back suddenly, but the light spring is compressed by the inertia of the rack and pinion, and the indicator recoil is made much less sudden and without danger of damaging.

Referring to the drawings:

Fig. 1 illustrates one embodiment of this invention in a spring balance.

Fig 2 is a section on the line 2ª—2ª.

A scale provided with a casing or frame 10 has an indicator 11 pivoted on the shaft 12, on which is also located pinion 13 actuated by rack 14. A spring, or other guide means, 15, keeps the rack in engagement with the pinion. A load support 16 moves under the influence of coil springs 17 and 18 on the application of load, coil springs 17 and 18 being secured between the casing and beam 19 connected to the load support. A pin 20 projecting from beam 19 (as shown in drawing) engages the open slot 21 in the lower portion of the rack 14, so that, as the beam 19 is moved downward, pin 20 engages rack 14 and actuates the indicator. Between a projecting flange 27 of the lower portion of the rack and the beam 19 are arranged a pair of light coil springs 23 and 24, wound about the guides 25 and 26, secured to the beam (as shown in Fig. 2). These guides extend through flange 27 in elongated perforations.

Upon sudden release of the load, the strong springs 17 and 18 snap back the beam 19 and pin 20 with considerable force, but, inasmuch as slot 21 is open at the top, the rack 14 is not carried back at the speed of recoil. In snapping back, the light springs 23 and 24 are compressed under the inertia of the indicator and its actuating mechanism, so that these light springs are effective in returning the indicator to its zero position more slowly and without danger of bending the indicator or stripping the teeth of the rack or pinion. The slightly elongated holes in the flange 27 prevent transmission of forward or backward thrust upon the load support to the rack 14. By making the coil spring 24 of slightly greater strength than spring 23, the guide spring 15 may be dispensed with and the rack 14 maintained in engagement with pinion 13, due to a slight tilting action of the stronger spring 24.

Among the advantages of this invention may be mentioned the added safety to the scale, its indicator and transmission mechanism, whereby all light parts movable under the influence of the load or springs are safeguarded against breakage on sudden recoil of the strong springs or against damage upon their being suddenly stopped at the zero position. The interposition of the light spring or springs between the beam and the indicator actuating mechanism enables the indicator and its light actuating mechanism to be returned to no-load position slowly under the influence of the light springs, which are so constructed as to preclude the possibility of damaging any of the moving parts.

I claim:

1. In a load measuring device of the spring type, the combination with a spring, of an indicator for measuring the load applied to said spring, actuating mechanism for the indicator means directly connecting said spring and actuating mechanism on application of the load, and a yieldable connection between said spring and actuating mechanism operable on release of said load.

2. In a load measuring device of the spring type, the combination with a pair of coil springs, of a beam to which said springs are connected, an indicator, a rack for actuating said indicator and engaged by said beam for movement therewith on application of the load, means for maintaining said rack in position to actuate the indicator, said rack and the beam being yieldably connected to enable the beam to be returned to no-load position more rapidly than the rack, the yieldable connection between the rack and the beam comprising a pair of relatively light springs arranged on each side of the place of engagement between said rack and beam to be compressed under inertia of the indicator and its rack on sudden release of the load, and guide means for said beam also arranged on each side of its engagement with said rack.

3. In a load measuring device of the spring type, the combination with a pair of coil springs, of a beam to which said springs are connected, an indicator, a rack for actuating said indicator and engaged by said beam for movement therewith on application of the load, means for maintaining said rack in position to actuate the indicator, said rack and the beam being yieldably connected to enable the beam to be returned to no-load position more rapidly than the rack, the yieldable connection between the rack and the beam comprising a pair of relatively light springs arranged to be compressed under inertia of the indicator and its rack, one of the said springs being stronger than the other and arranged to maintain the rack in position for actuation of said indicator.

4. In a load measuring device of the spring type, the combination with a pair of coil springs, of a beam to which said springs are connected, an indicator, a rack for actuating said indicator and having a slot therein, a pin on said beam engaging the rack in a slot open at one end for moving the rack with the beam on application of the load, the pin being movable in said slot to permit recoil movement of the beam relative to the rack and a light spring between said beam and rack for returning the rack and indicator to no-load position more slowly than if connected for movement with the beam on recoil.

5. In a load measuring device of the spring type, the combination with a spring, of an indicator for measuring the load applied to the spring, a rack actuating said indicator, means to which load is applied, mechanism positively engaging said rack and load means on the application of load, and yieldable means between said rack and load means on release of load arranged to permit slow return of the rack and indicator on sudden release of the load.

Signed at New York city, in the county of New York and State of New York, this 20th day of April A. D., 1926.

JOHN W. ROCKEFELLER, Jr.